Oct. 25, 1955 A. A. BECKSTRAND 2,721,927
POULTRY SINGER
Filed Sept. 23, 1954 2 Sheets-Sheet 2
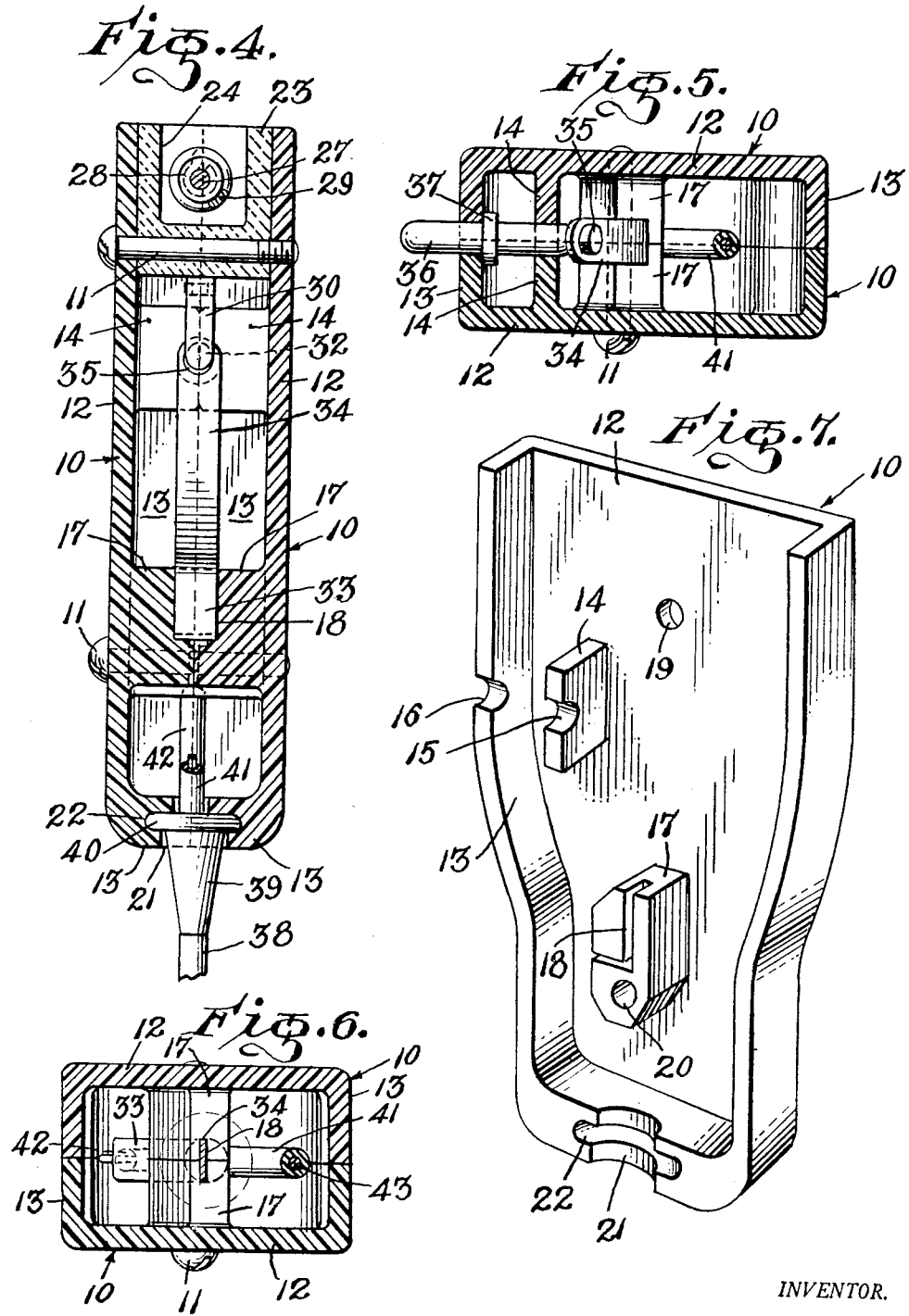
INVENTOR.
Anna A. Beckstrand United States Patent Office 2,721,927
Patented Oct. 25, 1955

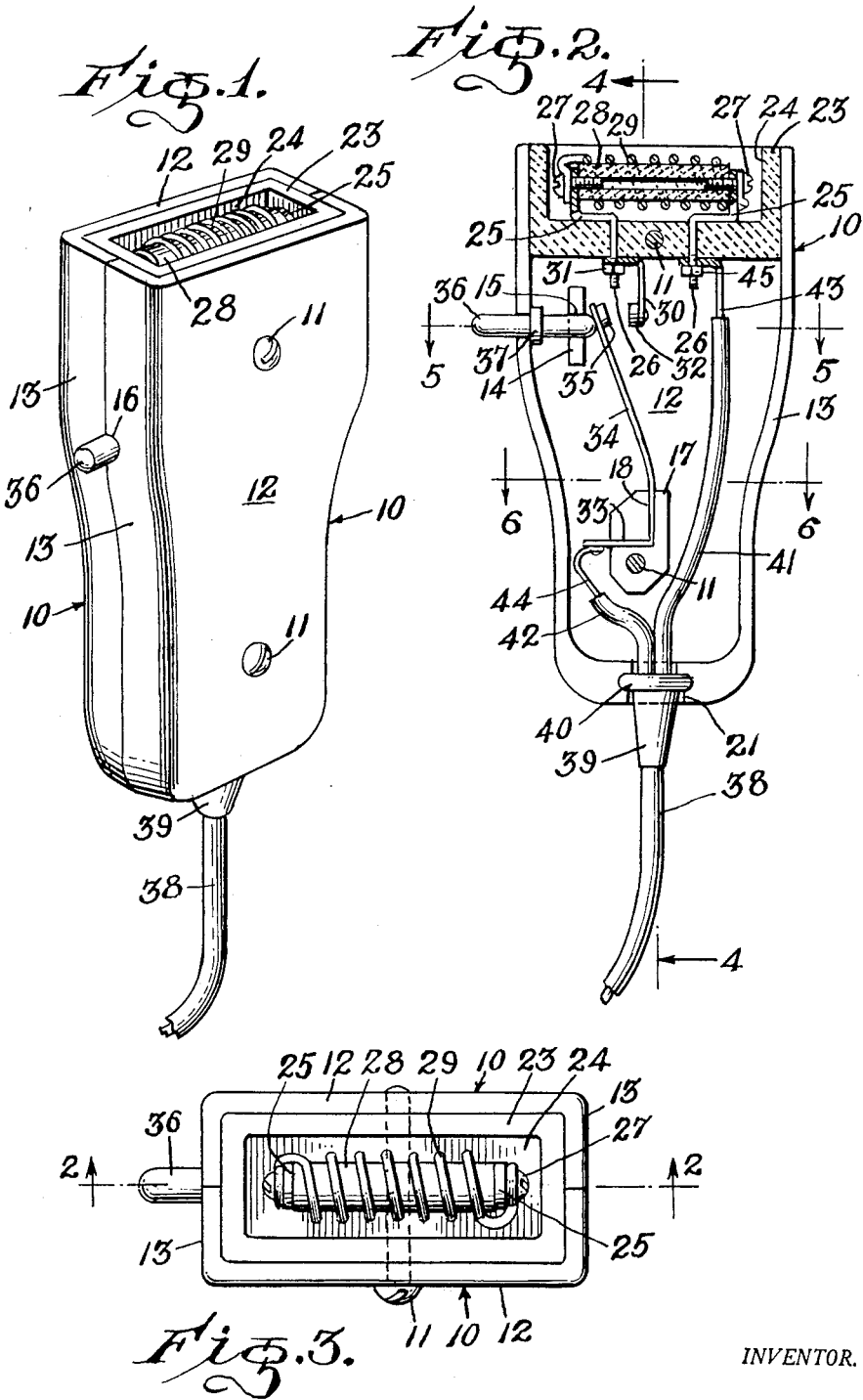

2,721,927
POULTRY SINGER
Anna A. Beckstrand, Wildwood, N. J.
Application September 23, 1954, Serial No. 457,905
5 Claims. (Cl. 219—29)

This invention relates to singeing devices.

It is an object of the present invention to provide a singeing device for poultry particularly adapted to be used by housewives and cooks for removing hairs completely from chicken, turkey and other fowl.

It is another object of the present invention to provide a singeing device for poultry which is actuated by a spring leaf switch member which is manually operable from the outside of the device by means of a push button, which push button must be pressed in order to establish contact of the switch and to energize the heating element.

It is still another object of the present invention to provide a singeing device for poultry wherein all the parts are housed between complementary casing members, which latter may be easily and readily separated by removing through screws to provide access to the interior of the device for servicing.

Other objects of the present invention are to provide a singeing device for poultry bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Figure 1 is a perspective view of a preferred embodiment;

Fig. 2 is a view shown partly in elevation and partly in section and taken along the line 2—2 of Fig. 3;

Fig. 3 is a top plan view thereof;

Fig. 4 is a longitudinal sectional view thereof taken along the line 4—4 of Fig. 2;

Fig. 5 is a transverse sectional view thereof taken along the line 5—5 of Fig. 2;

Fig. 6 is a transverse sectional view thereof taken along the line 6—6 of Fig. 2; and Fig. 7 is a perspective view shown alone of one of the casing halves.

Referring now more in detail to the drawing, there is shown a singeing device for poultry made up of a pair of complementary casing halves or shells 10 secured together by the through screws 11, substantially as illustrated.

Since both of the shells 10 are identical in construction but of opposite hand, only one will be described in detail. As shown in Fig. 7, each shell 10 comprises a side wall 12 of plastic or other suitable material formed along its vertical edges and bottom with a peripheral end wall 13, the peripheral wall 13 being continuous and adapted to abut the corresponding peripheral wall of the other shell half. The inner face of the side wall 12 is integrally formed with a laterally extending block 14 provided on its vertical edge remote from the side wall 12 with a semicircular bore 15 adapted to register with the corresponding bore of the complementary block of the other shell to form a cylindrical bore. The peripheral wall 13 is provided with a semicircular bore 16 identical in size and aligned with the bore 15. The lower portion of the side wall 12 on the inner face thereof is integrally formed with a second block 17 provided on its face remote from the side wall 12 with an L-shaped slot 18 for a purpose which will hereinafter become clear, the slot 18 being aligned with a complementary slot provided on the corresponding block 17 of the other shell. The side wall 12 is provided with an opening 19 therethrough adapted to be aligned with an internally threaded opening provided in the other shell, while the block 17 is provided with an opening 20 adapted to be aligned with an opening provided in the complementary block 17 and extending through the side walls 12. The shells are secured in the assembled relationship of Fig. 1 by means of the through screws 11 which pass through the openings 19 and 20.

The bottom portion of the peripheral wall 13 is provided with a semicylindrical bore 21 on its edge remote from the side wall 12, the wall 13 at the center of the bore 21 being provided with a second enlarged bore 22.

A rectangular block 23 of heat refractory material is positioned within the open upper end of the device and is provided with a rectangular hollow portion 24 extending downwardly from the upper surface thereof. It will be noted that the upper through screw 11 passes through the block 23 whereby to secure the latter in position.

A pair of complementary stepped brackets 25 of electrically conductive material have their inner vertical portions extending downwardly through the bottom of the block 23 where they terminate in externally threaded depending ends 26 (Fig. 2), the outer vertical portions of the brackets 25 within the hollow portion 24 being provided with internally threaded openings therethrough and to which are screwed the screws 27 which mount the opposite ends of a core 28 of heat refractory material. A coil 29 of wire having a high resistance is wound around the core 28, the opposite ends of the coil 29 being secured intermediate the heads of the screws 27 and the brackets 25.

An L-shaped conductive strip 30 is secured to one of the externally threaded extensions 26 by means of a nut 31, the other end of the strip 30 depending from the bottom of block 23 into lateral alignment with the bores 15 and fixedly carrying a contact 32 (Fig. 2).

A second L-shaped conductive strip 33 is positioned intermediate the registering slots 18 and is integrally formed at its upper end with a resilient upwardly and outwardly extending portion 34 which fixedly carries a contact 35 adapted to abut the contact 32 when the portion 34 is forced into a vertical position by means of an elongated push button 36 slidably positioned within the registering bores 16. The push button 36 is normally urged into the position of Fig. 2 by the spring member 34, the outward displacement of the push button 36 being limited by a shoulder 37. Thus, the contacts 35 and 32 will normally be separated from each other with the push button 36 disposed in the outwardly urged position and upon pressing the push button 36 inwardly against the resilient member 34, the contacts 35 and 32 will be closed.

An electrical cord 38 is provided with a frusto-conical enlargement 39 which fits within the lower end of the bore 21, the portion 39 being retained within the bore 21 by means of a rolled enlarged edge 40 which fits within the enlarged bore 22 as will be obvious. The cord 38 includes the insulated branches 41 and 42 containing wires 43 and 44, respectively. The branch 41 extends upwardly within the shells and the wire 43 thereof is secured to the lower end of the other bracket 25 by means of a nut 45 (Fig. 2). The other branch 42 extends around the block 17 and the wire 44 thereof is connected to the conductor strip 33 to complete the wiring.

In operation, with the electrical cord 38 connected at its other end to a suitable source of household power, upon pressing the push button 36 inwardly the contacts 35 and 32 will be closed to supply current to the high resistance coil 29, causing the latter to become incandescent and to glow in the same manner as the high resistance wires of an electric toaster. The device will then be brought into contact with the poultry with the upper edges of the block 23 in contact with the skin, the hairs being received downwardly within the bore 24 and being singed by the coil 29. Thus, the poultry will be singed, and hairs will be completely removed therefrom in an easy and ready manner. It will be noted that the coil 29 will normally be de-energized when the device is not in use, to prevent accidental fires and that in order to energize the coil 29, the push button 36 must be pressed inwardly against the action of the spring strip 34.

While various changes may be made in the detail construction, it shall be understood that such changes shall be within the spirit and scope of the present invention as defined by the appended claims.

What I claim as new and desire to protect by Letters Patent of the United States is:

1. A singeing device comprising a hollow casing open at one end, a block of heat refractory material positioned within the open end of said casing, said block having a hollow portion extending inwardly from the outer face thereof, a pair of spaced conductor brackets within said hollow portion extending inwardly through said block to the interior of said casing, a core of heat refractory material secured between said brackets within said hollow portion, a coil of high resistance wire wound around said core and connected at opposite ends to said conductor brackets, said wire and coil being freely spaced from the sides of said hollow portion, wire means for connecting said conductor brackets to a source of current, said casing including a transverse member connecting the opposite sides thereof below said block, said transverse member having a bore therethrough, the end of said casing having a bore therethrough aligned with said transverse member bore, an elongated cylindrical member slidable within said aligned bores, outward displacement of said cylindrical member being limited by a shoulder provided thereon by said casing, a second transverse portion within said casing having an L-shaped slot, an L-shaped conductor strip within said slot and extending upwardly therefrom and outwardly into resilient contact with the inner end of said cylindrical member, an electrical contact carried by the inner face of the upper end of said conductor strip, a depending conductor strip secured to one of said conductor brackets below said block and extending downwardly in lateral alignment and freely spaced from said contact, a second contact carried by said depending strip and adapted to abut said first contact upon inward movement of said cylindrical member.

2. A singeing device according to claim 1, said wiring means comprising electrical cord passing through the upper end of said casing, one branch of said electrical cord being connected to the other of said conductor brackets below said block, the other branch of said cord being connected to the other end of said L-shaped conductor strip.

3. A singeing device according to claim 2, said casing being formed of complementary halves, and through screw means securing said halves in assembled relationship to each other one of said through screw means passing through said block whereby to secure the same in position, said transverse member being formed of complementary, registering portions formed on the inner faces of said complementary halves and having semicircular bores adapted to be aligned with each other whereby to slidably receive said cylindrical member therethrough, said second transverse portion being formed of complementary registering portions formed on the inner faces of said halves and having registering substantially L-shaped slots, one of said through screw means passing through said registering second transverse members.

4. A singeing device according to claim 3, each of said halves including side walls integrally formed on vertical and lower edges thereof with a continuous peripheral wall adapted to register with the peripheral wall of the complementary shell halves, each of said peripheral walls being formed with a semicircular bore adapted to be aligned with a semicircular bore of said first transverse member.

5. A singeing device according to claim 4, the bottom portion of said peripheral wall having an enlarged bore receiving said electrical cord therethrough, a frusto-conical enlargement on said electrical cord received within said enlarged bore, said peripheral bottom wall having a central further enlarged bore, the end of said frusto-conical portion being enlarged and adapted to fit within said further enlarged bore.

References Cited in the file of this patent

UNITED STATES PATENTS

| 1,378,137 | Ross | May 17, 1921 |
| 1,670,998 | Vollmer et al. | May 22, 1928 |
| 2,038,555 | Eidschun | Apr. 28, 1936 |
| 2,240,913 | Roskos | May 6, 1941 |
| 2,680,801 | Casterline | June 8, 1954 |

FOREIGN PATENTS

| 615,392 | Great Britain | Jan. 5, 1949 |